United States Patent [19]
Tanioka

[11] Patent Number: 4,698,690
[45] Date of Patent: Oct. 6, 1987

[54] IMAGE SIGNAL PROCESSOR
[75] Inventor: Hiroshi Tanioka, Tokyo, Japan
[73] Assignee: Canon Kabushiki Kaisha, Tokyo, Japan
[21] Appl. No.: 633,295
[22] Filed: Jul. 23, 1984
[30] Foreign Application Priority Data
  Jul. 28, 1983 [JP] Japan .................. 58-138552
[51] Int. Cl.$^4$ .............................. H04N 1/40
[52] U.S. Cl. ..................... 358/283; 358/280
[58] Field of Search ............ 358/280, 282, 283; 382/54, 53; 340/347 AD

[56] References Cited
U.S. PATENT DOCUMENTS

| | | | |
|---|---|---|---|
| 3,723,649 | 3/1973 | Pitegoff et al. | 358/282 |
| 4,414,581 | 11/1983 | Kato et al. | 358/283 |
| 4,475,127 | 10/1984 | Iimuma | 358/283 |
| 4,495,522 | 1/1985 | Matsumawa et al. | 358/283 |
| 4,517,605 | 5/1987 | Yokomizo | 358/283 |
| 4,578,712 | 3/1986 | Matsumawa | 358/283 |
| 4,578,715 | 3/1986 | Yamaguchi | 358/283 |

Primary Examiner—Edward L. Coles, Sr.
Attorney, Agent, or Firm—Fitzpatrick, Cella, Harper & Scinto

[57] ABSTRACT

An image signal processor capable of achieving an excellent image reproduction. The image signal processor has an input unit for entering analog video signals, and a converter for converting the analog video signals to digital video signals with a conversion factor which is changed according to the signal level, wherein binary video signals are formed based on the digital video signals from said converter.

15 Claims, 8 Drawing Figures

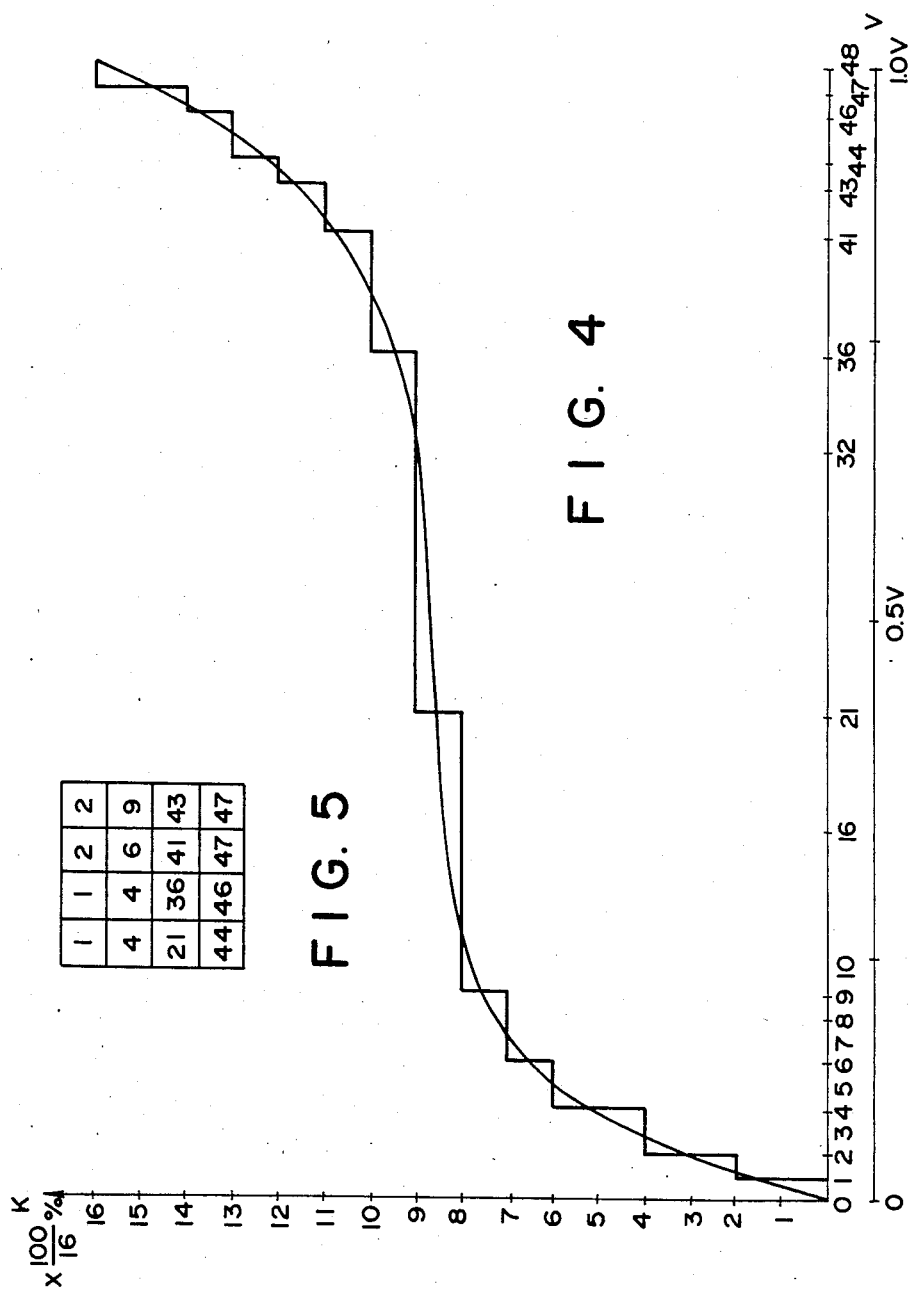

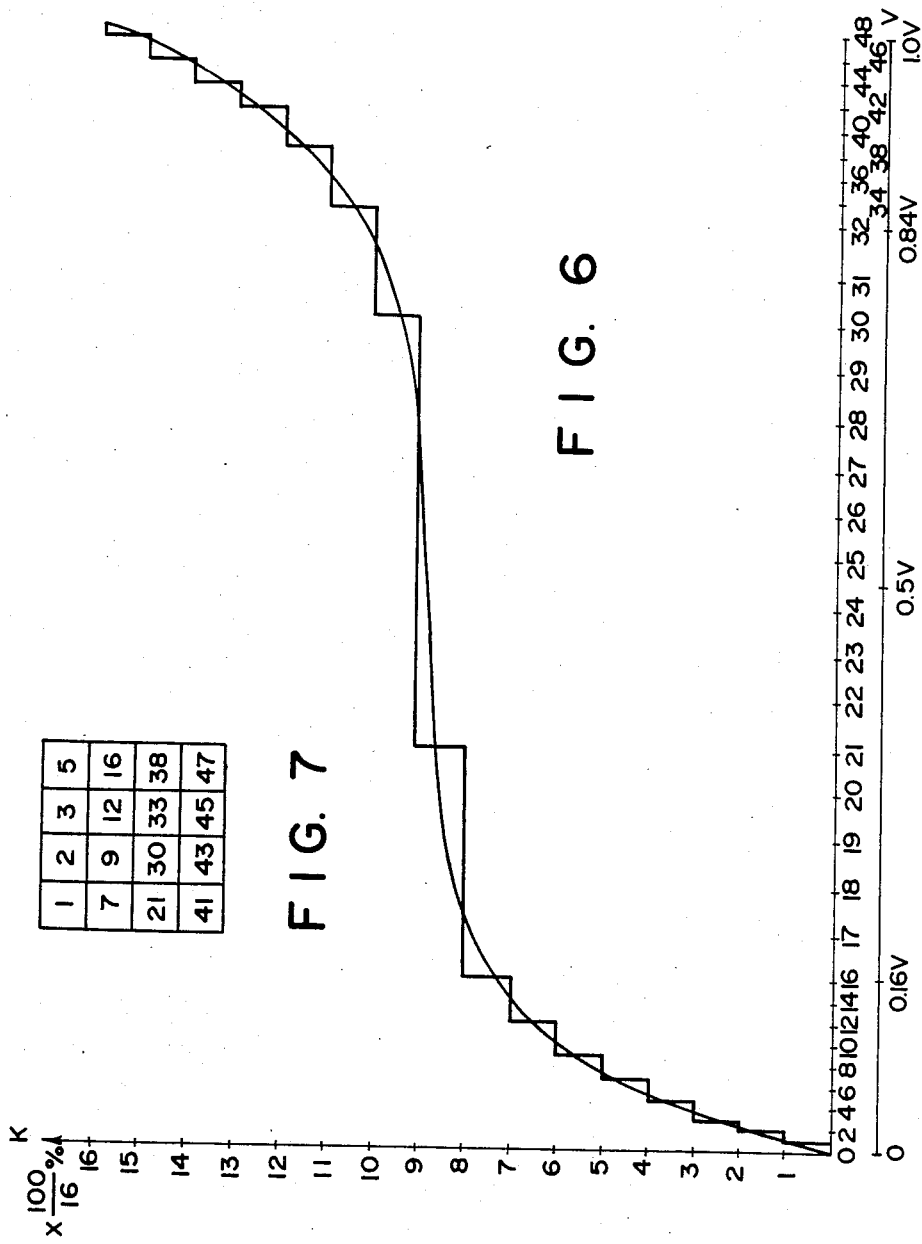

IMAGE SIGNAL PROCESSOR

BACKGROUND OF THE INVENTION

1. Field of the Invention

The present invention relates to the field of image signal processors for processing an image as electric signals.

2. Description of the Prior Art

A copying machine wherein an original image is read photoelectrically by a solid-state image pickup device, typically a CCD (Charge Coupled Device), and image recording is performed based on thus read-out signals, that is, a so-called digital copying machine, has been proposed. Some copying machines provide image file and image transmission functions in addition to the copying functions such as above.

Many machines of this kind are those for regenerating the gradation characteristic of a halftone image, typically of a photograph, in the original artificially by the dither method, and it is generally known to perform the so-called gamma correction by properly selecting from among threshold values forming the dither matrix for the 1:1 correspondence between the density of the original and the density of the reproduced image.

FIG. 1 illustrates the image reproduction characteristics according to the above gamma correction. Area 1 shows a density detection characteristic (reader characteristic) in relation to the original density $D_0$ and the output V of a solid-state image pickup device, and there an example is shown that an analog signal of 0 V is generated when $D_0=0.1$ and one of about 1.0 V is generated when $D_0=2.0$ (that is, black) is shown. Area 3 shows a printer characteristic which is the relationship between the number of dots K per unit area (hereinafter referred to as the cumulative frequency) and the density Dp of the reproduced image, and it is shown that by printing 16 dots in a unit area the density Dp becomes 2.0 (that is, black) and that image reproduction becomes possible at the density of $Dp=0.1$ by printing no dots. Here, an example showing that as many as 16 levels of density can be obtained by the use of a 4×4 dither matrix is given. Area 2 shows a dither characteristic, and shows a curve to determine the number of dots (up to a range of zero to 16 dots) which should be printed for achieving the image reproduction of the density equal to the original density for a density signal detected within the output range from 0 V to 1.0 V of the solid-state image pickup device.

Accordingly, now, when an original density Dd (shown in FIG. 1) has been detected, it is known how the density of reproduced image equal thereto can be obtained in the area 4 by following an arrow.

On the other hand, if the density relationship between a desired reproduced image and the original is given in the area 4, any desired dither characteristic (gamma correction curve) in the area 2 can be set considering the reader and printer characteristic curves of the areas 1 and 3.

Generally, for realizing the density of 16 gradations by the dither method, an analog video signal indicating the original density is converted to a digital value, and binary data indicating whether or not dots are to be printed is formed by comparing the resultant digital value with the threshold values (dither pattern threshold value group) stored in a advance in a memory. That is, the analog signal is converted to a binary signal. Here, for the gamma correction using a curve required in the area 2, it is necessary that a video signal be digitized by the resolution of at least the reproduced image density levels (16 levels in this example), and the larger the number of levels, the more abruptly changing a curve in the area 2 can be realized in the digital fashion.

As can be seen for the characteristic in the area 2, however, even if digitization is made to a great many levels, the output change factor in the intermediate area of 0 to 1 V is small so that there is no favorable effect of digitizing to many levels, and providing a multi-level A/D converter is of little benefit.

SUMMARY OF THE INVENTION

An object of the present invention is to provide an image signal processor capable of achieving an excellent image reproduction.

A further object of the present invention is to provide an image signal processor having enhanced capability for reproduction of the image density.

A further object of the present invention is to provide an image signal processor which has gamma correction operation as to the image reproduction favorably and effectively carried out.

A further object of the present invention is to provide an image signal processor capable of reproducing halftone images at a high fidelity without increasing the number of levels of analog-digital conversion.

The novel features which are believed to be characteristic of this invention, both as to its method of operation and advantages thereof, together with the above and other objects of the present invention, will be better understood from the following description.

BRIEF DESCRIPTION OF THE DRAWINGS

FIG. 4 and FIG. 6 are diagrams showing the condition of analog-to-digital conversion of an analog signal;

FIG. 5 and FIG. 7 show examples of the dither pattern; and

DETAILED DESCRIPTION OF THE PREFERRED EMBODIMENTS

The present invention will now be described in detail with reference to the accompanying drawings.

Figure 1:
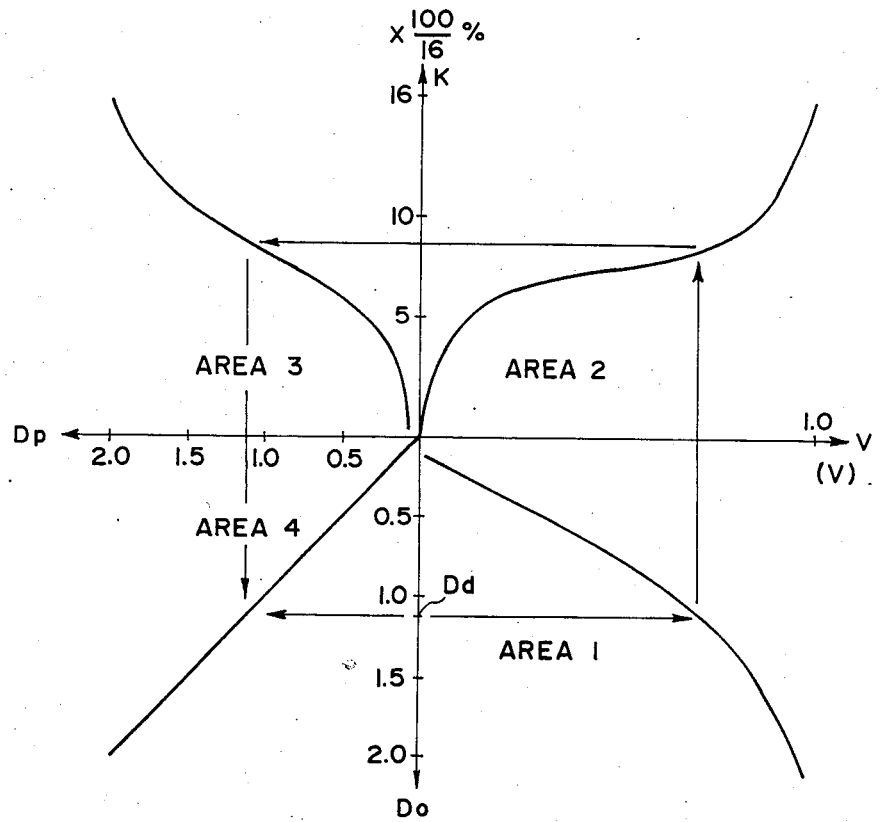
FIG. 1 is a diagram showing image reproduction characteristics.
Figure 2:
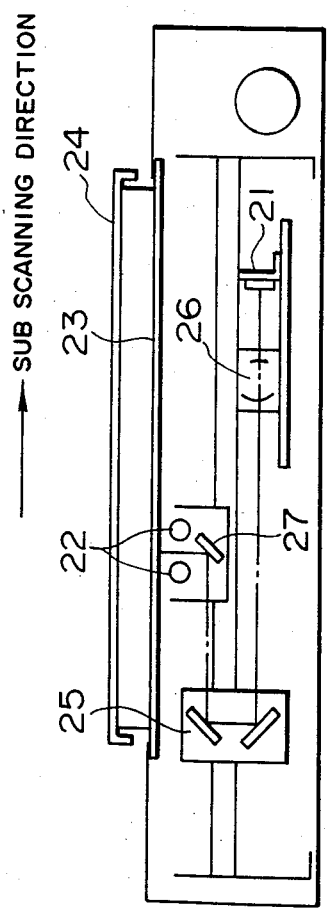
FIG. 2 is a schematic drawing of a reader to which the present invention is applicable.

FIG. 2 is a schematic drawing of an original image reader (reader) the present invention is applied to. The original is set on an original glass 23 with its face down. The reference point of the original setting is at the furthest end on the lefthand side as viewed from the front. The original is pressed against the surface of the original glass 23 by an original cover 24. The original is illuminated by a fluorescent lamp 22, and the optical path is formed so that its reflected light converges on the surface of a CCD 21 (image sensor) having a plurality of photosensors arranged in an array, through mirrors 25, 27 and a lens 26. The mirror 27 and the mirror 25 are designed to move at a relative speed of 2:1. This optical system is moved from left to right, as seen in FIG. 2 at a fixed speed by a DC servo motor applying PLL, and performs sub scanning. The resolution in this sub scanning direction is 16 lines/mm.

The main scanning width is 257 mm in the transverse width of the maximum B4 side (257 mm×364 mm). Since 4112 CCD bits (257×16) are required to make resolution at 16 pel/mm, this equipment has been designed to perform a read operation using a CCD array sensor having photosensors of about 5,000 bits.

Images of the original set on the original glass 23 in the manner as mentioned are read lines by line sequentially, and analog signals indicating shading which have been output from the CCD 21 are converted to digital video signals of predetermined bits by the picture element. The digital video signal is converted to a binary conversion circuit. The binary signal is further subjected to compression, typically by the modified Huffman system, and transmitted to receiving side equipment (typically a printer) via a transmission line or stored in an image file having a storage medium, such as a magnetic or an optical disc.

Figure 3:
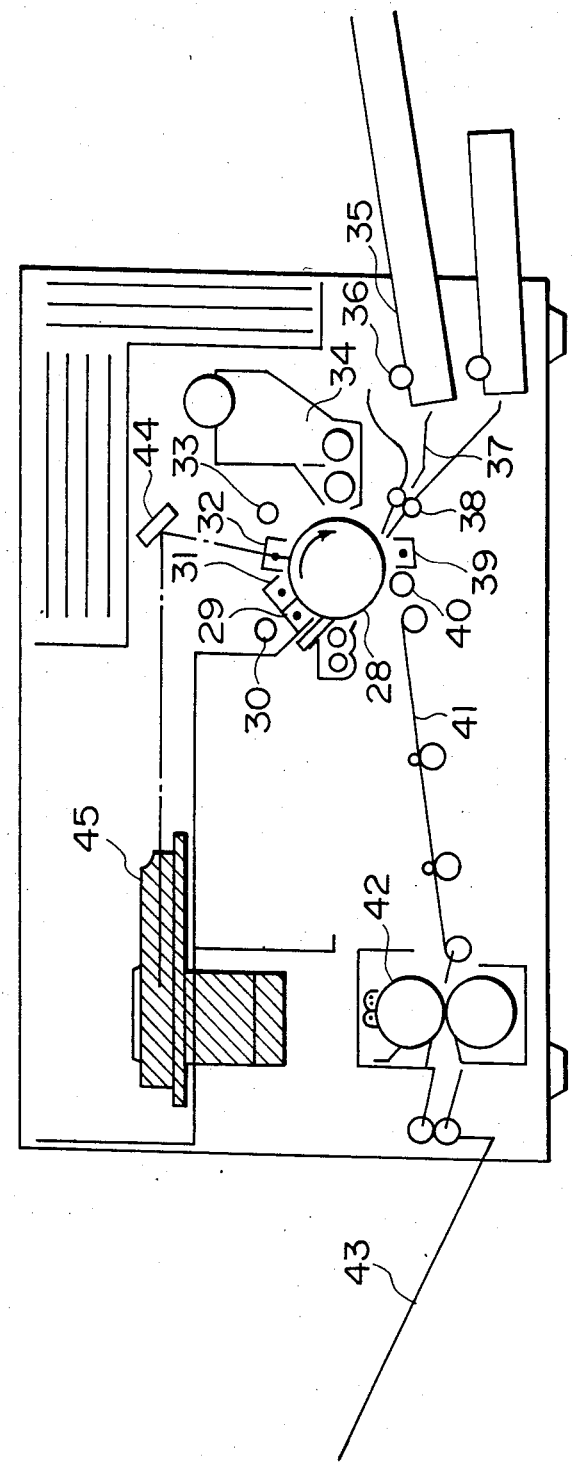
FIG. 3 is a schematic layout diagram of a printer performing printing operation based on image signals from the reader of FIG. 2.

FIG. 3 is a schematic layout diagram of a printer performing printing operation based on the video signal transferred from the reader shown in FIG. 2. The bit serial binary video signal fed via the transmission line is fed to a laser scanning optical system unit 45 of the printer. The unit 45 is comprised of a semiconductor laser, a collimator lens, a rotary polygonal mirror, an Fθ lens, and a fall correction optical system. The video signal from the reader is applied to the semiconductor laser, the electric-to-light conversion takes place, emitted laser beams are made into parallel rays at the collimator lens, those rays are radiated to the polygonal mirror, and the laser beams scan a photosensitive element 28. As a result, a latent image of a collection of dots is formed on the photosensitive element 28.

The photosensitive element 28 comprises a conductive layer, a photosensitive layer, and an insulation layer. Accordingly, process components which make possible image forming are provided. 29 is a pre-neutralizer, 30 is a pre-neutralizing lamp, 31 is a primary charger, 32 is a secondary charger, 33 is a front exposure lamp, 34 is a developer for developing a latent image, 35 is a sheet feed cassette, 36 is a sheet feed roller for feeding copy sheet from the cassette, 37 is a sheet feed guide, 38 is a registration roller, 39 is a transfer charger for transferring an image to the copy sheet, 40 is a separation roller for separating the copy sheet from the photosensitive element 28, 41 is a transfer guide, 42 is a fixer, and 43 is a tray. By these process components the image forming based on the video signal from the reader is made on the copy sheet.

Now, in order to clarify the features of the present invention, what occurs in the area 2 when the dither gamma correction has been performed by the A/D conversion of a video signal (0–1.0 V) outputted from the solid-state image pickup device (CCD) to 48 levels equidistantly is shown in FIG. 4.

FIG. 5 shows a dither matrix, which is 4×4 in this case. In this case, the slope of the gamma correction curve is steep around levels 1, 2, 4, and 47. Since the resolving power of digital conversion is large, each gradation of cumulative frequencies (K) 1, 3, 5, and 15 cannot be realized. As a result, the capability is such that only 12 gradations are reproduced substantially. Accordingly, for reproducing the aforementioned 16 gradations, resolving power should be further increased at least to, say, 64 levels.

FIG. 6 shows that the gamma correction has been realized through A/D conversion by a conversion factor which varies according to the level area by following the present invention. Only the ranges from 0 to 0.16 V and from 0.84 to 1.0 V, where the slope of the gamma correction curve is steep, are A/D converted at a high resolving power of 16 levels, and the range from 0.16 to 0.84 V where the gamma correction curve is nearly horizontal is A/D converted to 16 levels at a low resolving power. It is evident by comparison with FIG. 4 that in spite of the same 48 levels resolving correction at 16 gradations can be realized high precision.

FIG. 7 shows the threshold values of dither to be used in this case.

Figure 8:
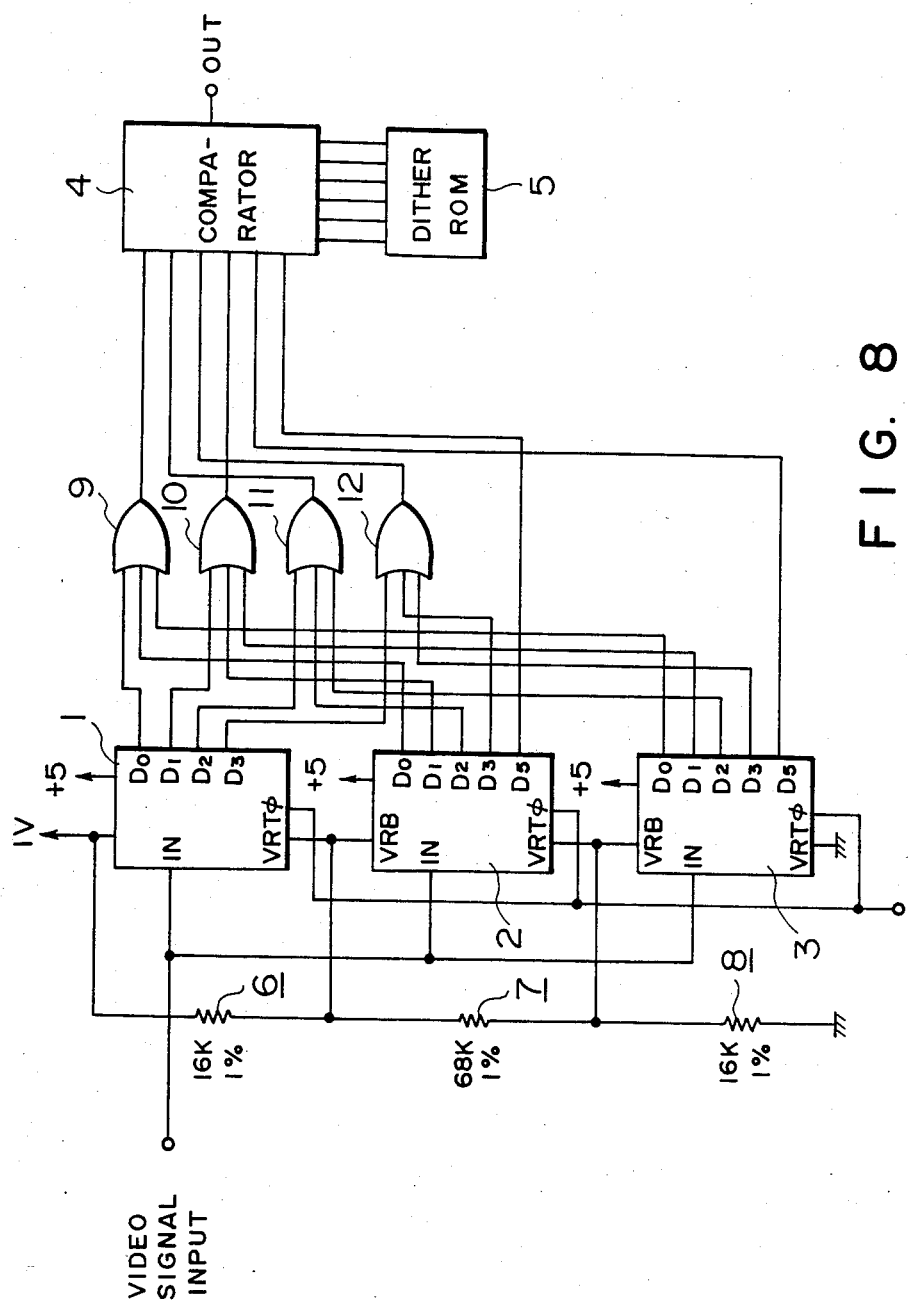
FIG. 8 is a circuit diagram for accomplishing A/D conversion according to FIG. 5.

FIG. 8 shows an A/D conversion circuit for varying the A/D conversion factor according to the level area as shown in FIG. 6. 1, 2, and 3 are 4-bit analog-to-digital (A/D) converters connected in parallel for analog digital signals to be fed from the CCD 21. By dividing the lowest voltage 1 V of the video signal at resistors 8, 7, and 6 respectively of 16K ohms, 68K ohms, and 16K ohms, the A/D converters 3, 2, and 1 are assigned to level areas of 0 to 0.16 V, 0.16 to 0.84 V, and 0.84 to 1.0 V respectively for the A/D converting operation, and convert each area to 16 levels as shown in FIG. 6.

When the input voltage exceeds the set width, each A/D converter output is cleared to the "L" level, and an overflow output terminal D5 becomes an "H" level output at the same time. Accordingly, when the lower 4 bits (D0-D3) of each A/D converter output are extracted at OR gates 9-12 and the overflow output D5 of the A/D converter 3 and that of the A/D converter 2 are treated as the 5th and 6th bits respectively, the input analog signal can be converted as a 6 bit, 48 level digital value.

A comparator 4 outputs the output (OUT) of level "1" which is for printing dots for a video signal exceeding the threshold value as a result of comparison of the threshold value string to be output from a dither ROM circuit 5 according to the dither pattern of FIG. 7 and the 48 level digital video signal to the aforementioned printer.

By performing A/D conversion dividing the analog video signal to be fed into to a plurality of voltage ranges in this manner, effective signal processing capable of providing a digital value of only the portion required for gamma correction at a high resolving power can be accomplished.

In addition, since the conversion factor for converting the input analog signal to a digital value can be varied between the level area requiring a high resolving power and that requiring not so high a resolving power, the total resolving power can be improved without increasing the number of bits, thus enhancing the efficiency.

Since, in this manner, the gamma correction operation is made possible without affecting reproduction capability of image density, an excellent image reproduction can be performed, that is, the reproduction of original image with a high fidelity can be achieved.

Although the present invention has been described in connection with the particular embodiments shown and discussed hereinabove, it is to be expressly understood that other alterations and modifications may be made by those having ordinary skill in the art without departing from the spirit and the scope of the present invention. For example, the level of the A/D conversion may be selected optionally according to the desired reproduction density, and the area for varying the A/D conversion factor is moved according to the slope of the gamma correction curve.

In addition, for the composition of the reader or the printer a reader using a so-called contact type image sensor or other types of printer, such as an ink jet printer or a thermal printer, may be used.

What is claimed is:

1. An image signal processor comprising:
   input means for entering an analog video signal representing a density of an image;
   means for converting the analog video signal fed from said input means to a digital video signal having a plurality of bits, said converting means having a plurality of analog-to-digital converters to which the analog video signal is applied on a parallel basis, said plurality of analog-to-digital converters being biased with mutually different reference voltage values so as to convert the analog video signal into the digital video signal on a non-linear characteristic basis; and
   processing means for performing processing for halftone reproduction on the digital video signal from said converting means.

2. An image signal processor according to claim 1, wherein said processing means forms a binary video signal to be used for pseudo halftone reproduction.

3. An image signal processor according to claim 2 which further comprises recording means for recording on a recording medium based on the binary video signal.

4. An image signal processor according to claim 1, wherein said input means has reading means for reading photoelectrically an original image and outputting an analog video signal corresponding thereto, to be fed to said converting means as the analog video signal to be converted to the digital video signal.

5. An image signal process according to claim 1, wherein said processing means performs dither processing on the digital video signal from said converting means.

6. An image signal processor according to claim 1, wherein said plurality of analog-to-digital converters are operable to convert the analog video signal into the digit video signal with mutually different resolutions.

7. An image signal processor according to claim 1, wherein said plurality of analog-to-digital converters are operable to respectively convert the analog video signal within mutually different level ranges into the digital video signal.

8. An image signal processor according to claim 1, further comprising a laser beam printer for recording an image on a recording medium based on the digital video signal processed by said processing means.

9. An image signal processor comprising:
   input means for entering an analog video signal representing a density of an image;
   means for converting the analog video signal fed from said input means to a digital video signal having a plurality of bits, said converting means having a plurality of analog-to-digital converters to which the analog video signal is supplied on a parallel basis, said plurality of analog-to-digital converters being operable to convert the analog video signal within mutually different level ranges into the digital video signal with with mutually different resolutions; and
   processing means for performing processing for halftone reproduction on the digital video signal from said converting means.

10. An image signal processor according to claim 9, wherein said processing means forms a binary video signal to be used for pseudo halftone reproduction.

11. An image signal processor according to claim 10, which further comprises recording means for recording an image on a recording medium based on the binary video signal.

12. An image signal processor according to claim 9, wherein said input means has reading means for reading photoelectrically an original image and outputting an analog video signal corresponding thereto, to be fed to said converting means as the analog video signal to be converted to the digital video signal.

13. An image signal processor according to claim 9, wherein said processing means performs dither processing on the digital video signal from said converting means.

14. An image signal processor according to claim 9, wherein said plurality of analog-to-digital converters are biased with mutually different reference voltage values.

15. An image signal processor according to claim 9, further comprising a laser beam printer for recording an image on a recording medium based on the digital video signal processed by said processing means.

* * * * *

UNITED STATES PATENT AND TRADEMARK OFFICE
CERTIFICATE OF CORRECTION

PATENT NO. : 4,698,690
DATED : October 6, 1987
INVENTOR(S) : HIROSHI TANIOKA

It is certified that error appears in the above-identified patent and that said Letters Patent is hereby corrected as shown below:

Title page:

AT [56] REFERENCES CITED

"4,475,127 10/1984 Iimuma ..... 358/283" should read
--4,475,127 10/1984 Iinuma ..... 358/283--
"4,517,605 5/1987 Yokomizo ..... 358/283" should read
--4,517,605 5/1985 Yokomizo ..... 358/283

COLUMN 1

Line 66, delete "a" (first occurrence).

COLUMN 2

Line 9, "small so" should read --small, so--.
Line 55, "(reader)" should read --("reader")--.
Line 67, "FIG. 2 at" should read --FIG.2, at--.

COLUMN 3

Line 10, "lines" should read --line--.
Line 32, "limetor" should read --limator--.

COLUMN 4

Line 11, "levels" should read --levels,--.
Line 12, "realized high" should read --realized with high--.

COLUMN 5

Line 38, "process" should read --processor--.
Line 45, "digit" should read --digital--.

UNITED STATES PATENT AND TRADEMARK OFFICE
CERTIFICATE OF CORRECTION

PATENT NO. : 4,698,690
DATED : October 6, 1987
INVENTOR(S) : HIROSHI TANIOKA

It is certified that error appears in the above-identified patent and that said Letters Patent is hereby corrected as shown below:

COLUMN 6

Line 18, delete "with" (second occurrence).

Signed and Sealed this

Ninth Day of February, 1988

*Attest:*

DONALD J. QUIGG

*Attesting Officer*     *Commissioner of Patents and Trademarks*